United States Patent [19]
Kotitalo et al.

[11] Patent Number: 5,121,863
[45] Date of Patent: Jun. 16, 1992

[54] RACK FOR TELEPHONE HAND SET

[75] Inventors: Jouko K. Kotitalo, Halikko; Jouko T. Tattari, Salo, both of Finland

[73] Assignee: Nokia Mobile Phones Ltd., Salo, Finland

[21] Appl. No.: 472,715

[22] Filed: Jan. 31, 1990

[30] Foreign Application Priority Data

Feb. 3, 1989 [FI] Finland .................. 890542

[51] Int. Cl.⁵ .................. B60R 7/06
[52] U.S. Cl. .................. 224/42.45 R; 224/42.42; 248/316.4; 379/446; 379/455; 269/233
[58] Field of Search ........ 224/311, 315, 325, 42.45 R, 224/271, 273, 42.44 R, 42.42 R; 24/524; 248/313, 316.4, 316.6, 316.8; 379/454, 455, 446, 449; 269/229, 232, 233, 247, 162, 196, 198

[56] References Cited

U.S. PATENT DOCUMENTS

| | | | |
|---|---|---|---|
| 3,658,219 | 4/1972 | Van Ordt | 224/42.45 R |
| 3,823,907 | 7/1974 | Ziaylek, Jr. | 248/313 |
| 4,047,686 | 9/1977 | Porter | 224/42.45 R |
| 4,061,258 | 12/1977 | Dysart | 224/42.45 R |
| 4,406,928 | 9/1983 | MacKenzie | 379/454 |
| 4,472,606 | 9/1984 | Krolopp et al. | 379/455 |
| 4,828,211 | 5/1989 | McConnell et al. | 248/316.4 X |
| 4,927,200 | 5/1990 | Wilkins | 224/271 |
| 4,984,722 | 1/1991 | Moore | 224/42.45 R X |

FOREIGN PATENT DOCUMENTS

| | | | |
|---|---|---|---|
| 586547 | 11/1959 | Canada | 379/446 |
| 124318 | 10/1901 | Fed. Rep. of Germany | 248/316.4 |
| 64-7054 | 3/1989 | Japan | 379/449 |

Primary Examiner—Ernest G. Cusick
Assistant Examiner—Glen T. Barrett
Attorney, Agent, or Firm—Darby & Darby

[57] ABSTRACT

A rack on which a telephone hand set is deposited in a vehicle includes a planar center part (17) with a flange part (16,16') on one end, and clamps (5,7) protruding from the center part (17), which can move between two extreme positions. On the center part (17) are also provided means for moving the clamps (5,7) so that the hand set can be detached from or secured to the rack.

8 Claims, 3 Drawing Sheets

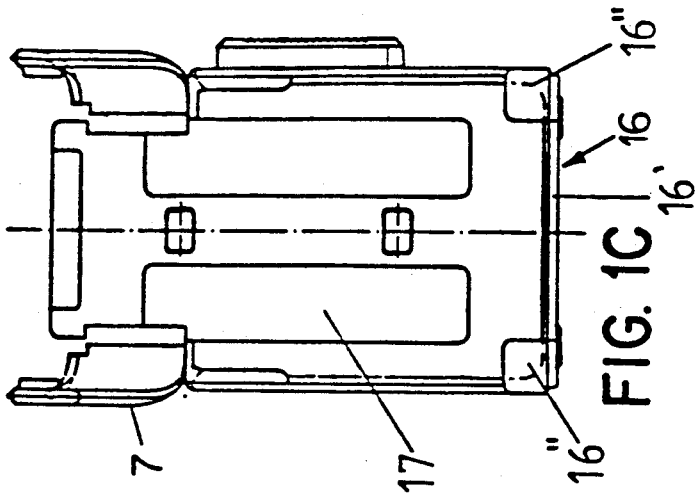
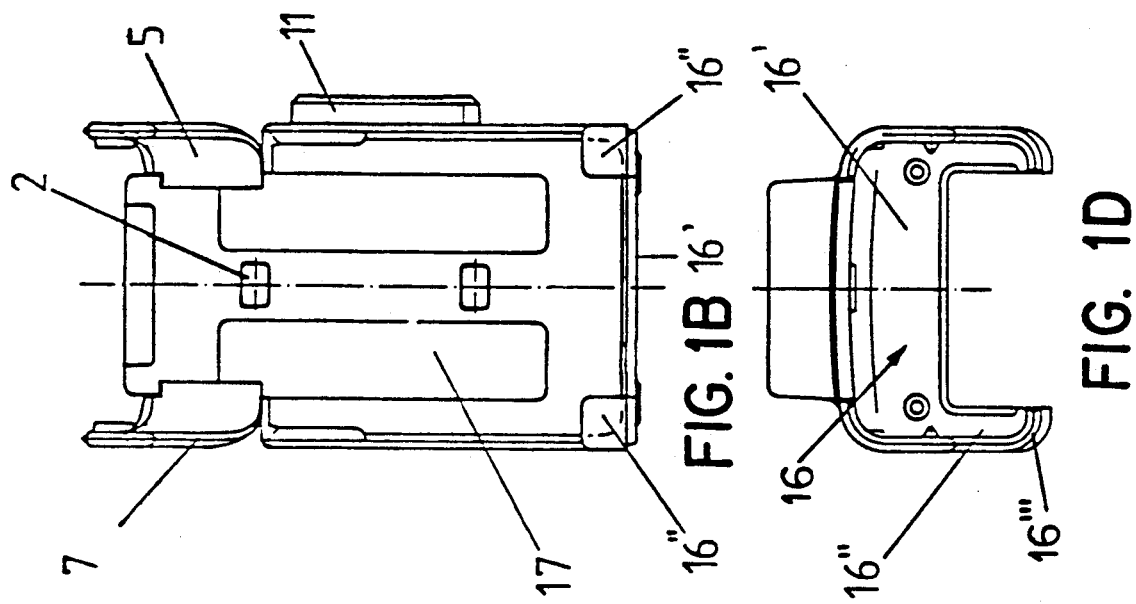
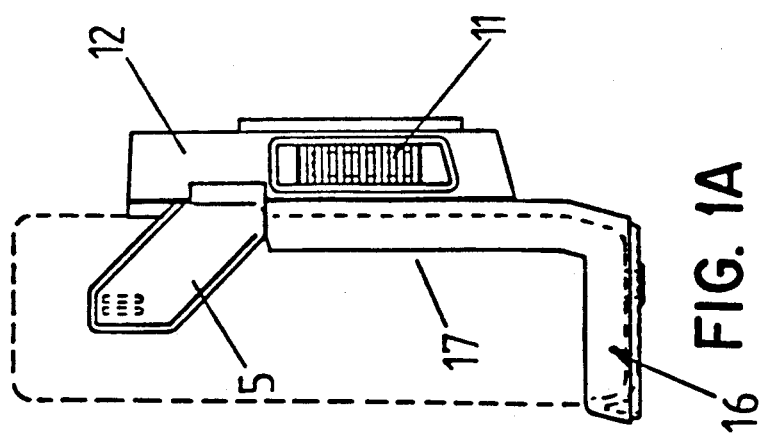

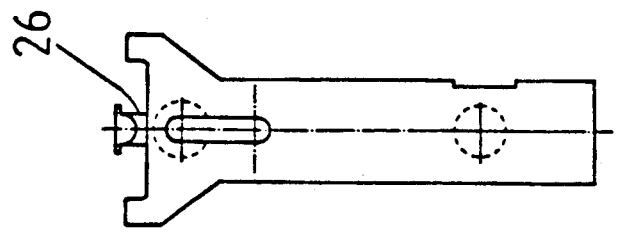
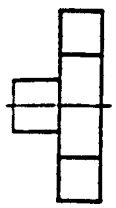
FIG. 2D   FIG. 2B   FIG. 2C
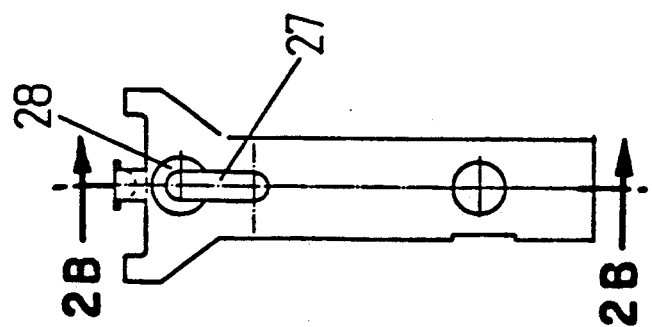
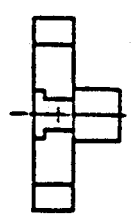
FIG. 2A   FIG. 2E

RACK FOR TELEPHONE HAND SET

BACKGROUND OF THE INVENTION

The present invention concerns a telephone hand set rack to be used in vehicles. The rack allows the phone to be reliably and easily deposited after a call and removed from the rack to place a call.

The use of car telephones is currently greatly increasing, causing increased concern regarding the safety and ergonomics of car phones with respect to the user's ability to drive. It is therefore desirable for the telephone hand set to be reliably held on the rack during driving and be easily and quickly detachable from the rack with one hand, permitting the user to operate the vehicle with the other. The hand set is most often loosely resting in a fork-like holder or equivalent device mounted on the dashboard or on the telephone operating means. The hook racks known in the art are limited in that the receiver component of the car telephone set cannot be reliably affixed to the rack when the rack is in an arbitrary position. The mounting has to be reliable and accessible to the driver, for example, the mounting of the rack on the steering post, which in many cases is ergonomically a good place for it, makes it reliable and accessible.

SUMMARY OF THE INVENTION

The object of the present invention is to provide a rack in which a hand set of a car telephone or the like is reliably held in all positions and from which the handset can easily be detached with one hand. The invention is mainly characterized in that when on article, i.e., the handset is placed on the rack, the securing clamps of the article automatically secure the article to the rack, and when the article is grabbed in order to detach it therefrom, a key which opens the securing clamps is pressed with the same grip. It is therefore essential that no separate securing and detaching operations are needed, such steps taking place, on the contrary, "automatically" in conjunction with the detaching and mounting steps by action of the mechanism of the present invention.

The invention also relates to the rack to which the means is secured.

BRIEF DESCRIPTION OF THE DRAWINGS

The invention is described in more detail by referring to the appended figures, in which:

FIGS. 1A, 1B, 1C and 1D present the rack in side elevation, front elevation with clamps closed, front elevation with claimps open and top plan views, respectively;

FIG. 2A shows the wedge of the locking and detaching mechanism in top view;

FIG. 2B shows the same in an elevational cross section view along line 2—2 in FIG. 2D;

FIG. 2C shows the same in bottom view;

FIG. 2D is a rear view of the locking and detaching mechanism of FIG. 2A;

FIG. 2E is a front view of the mechanism of FIG. 2A; and

DETAILED DESCRIPTION OF THE PREFERRED EMBODIMENTS

Figure 3:
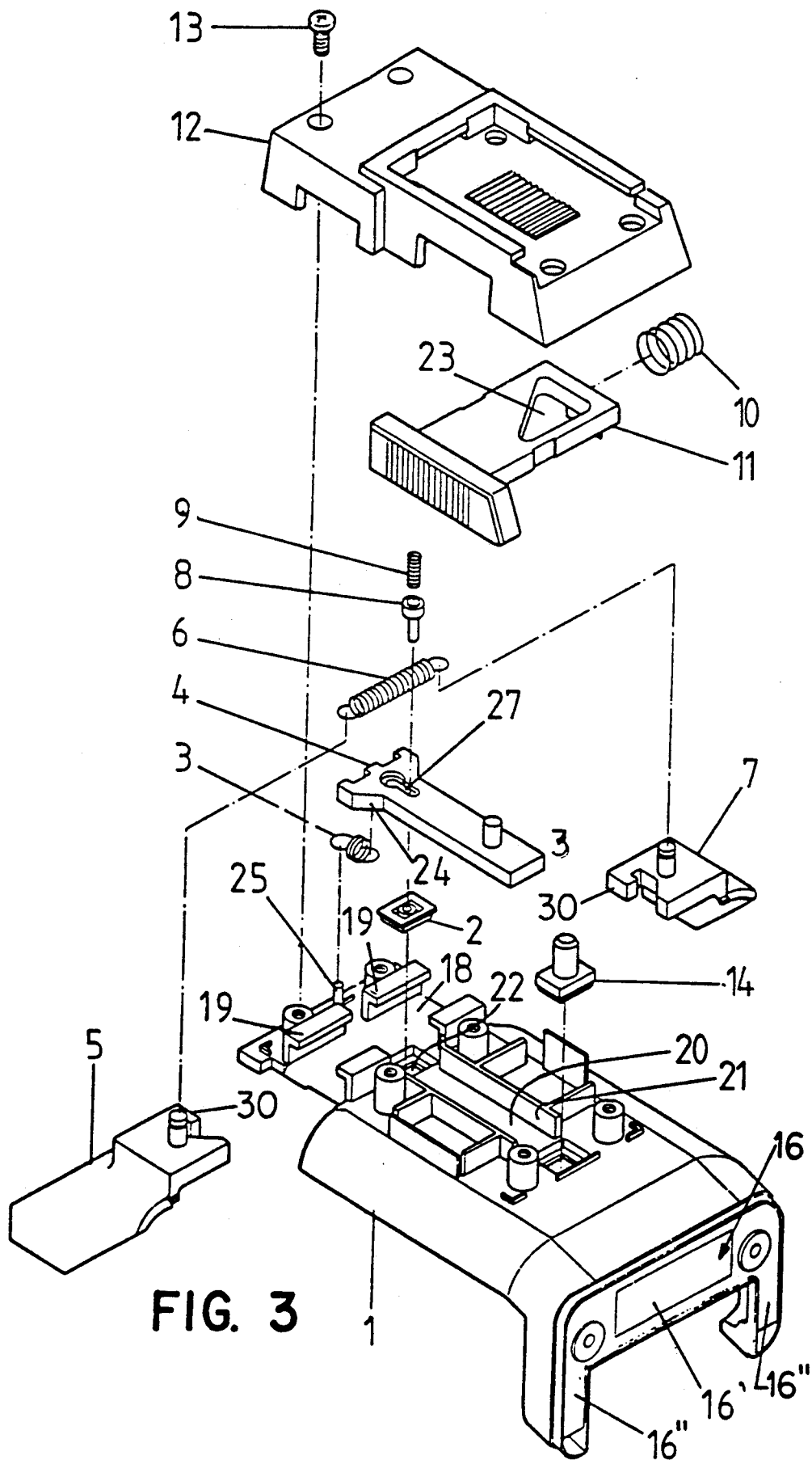
FIG. 3 presents an exploded view of an advantageous embodiment of the rack according to the invention.

FIGS. 1A–D present an embodiment of the rack of the invention. FIG. 1A shows with dot-and-dash lines the outline of the article, i.e., the telephone handset, to be deposited on the rack. The article is supported by a bottom part 16 and fluting 16''', advantageously comprises prongs 16' of the rack protruding from the substantially rectangular planar centre part 17 of the rack, and of a bridge part 16' connecting said prongs. The bottom part could equally be an integral sheet projecting from the centre part 17, but the present embodiment offers certain advantages which shall be referred to later. The article is also supported by the substantially planar centre part 17 of the rack. The article is securely kept in place by the action of clamps 5 and 7 which clamp the article between them. When it is desired to detach the article from the racks, one grabs the article e.g. palm of the right hand contacting the front of the middle section of the article in the direction of the arrow in FIG. 1A. With the same grabbing motion, the fingertips are pressed against the key, or bar 11 on the right side of part 17, whereby the mechanism releases the clamps 5, 7 from pressure, and the clamps snap into an opened position, away from each other and remain in this position, as seen in FIG. 1B. Thus shows the clamps in closed position and the clamps are shown in FIG. 1C in the open position.

In the exploded view shown in FIG. 3 the rack is shown facing downward so the locking and releasing mechanism of the clamps on the back of the rack according to the invention is readily apparent. The mechanism is composed of only a few parts. The locking clamps 5 and 7 are two arcuate parts which are able to move in grooves 18 in the centre part 17 defined by guides 19, transversely to the longitudinal axis of the centre part. Guides 21 define a slot for a wedge 4 to move in the direction of the longitudinal axis of the centre part. Furthermore, the centre part is provided with a piercing aperture 22 for a push button 2. In addition, the mechanism comprises a key, or bar 11, which is a mainly rectangular planar piece having a triangular aperture 23 close to one end.

The mechanism functions as follows.

When the clamps 5 and 7 are in closed position, they are located in the groove 18 and are pulled together by a spring 6. The ends of the spring are placed on pins on the surface of the clamps. Between the clamps lies one end of the wedge 4, said end being wider than the other end and provided with outwardly projecting surfaces 24. Said surfaces lie against the respective surfaces of the clamps 5 and 7. The clamps have end surfaces 30 which oppose each other and the wedge within the guides 19. The ends 30 of the clamps facing the wedge 4 have recesses complimentary to the shape of the outwardly projecting surfaces 24 of the wedge. Upon the wedge 4 and transverse thereto is provided a key, or bar 11 arranged so that the pin on the wedge enters the aperture 23 of the bar 11. In the closed position the pin or wedge 4 is located in the uppermost corner of the triangular opening 23 in bar 11 when the rack is in the named operating position, i.e., the rearmost corner as shown in FIG. 3. A spring 10 keeps the key, or bar in the outermost position. A spring 3 is attached at one end to a pin 25 on the frame and at the other end in a groove 26 on the undersurface of the triangular tip (FIG. 2C) of wedge 4, thus urging the wedge upward (to the rear in FIG. 3).

In the situation as described above the article, for instance a telephone hand set, is held tightly on the rack of the invention, being kept in place by the clamps 5, 7 the prongs 16' and the bridge 16'. The article will be held in the rack, whatever its position of use.

For vibration damping between the article and the rack there is provided a rubber boss 14 and a push button 2. When the user grabs the article, he will automatically take the article in a grip with the thumb contacting one side of the article and the fingers the other. This results in the fingertips simultaneously pressing the key 11 inwards, towards the transversal axis of the rack. Since the key is only movable in the lateral direction relative to the longitudinal axis of the centre part, the triangular aperture 23 forces the pin on the surface of the wedge to slide along the sloped side of the aperture 23 (the hypotenuse of the aperture triangle). As a result, the wedge 4 will move in the groove 20 away from the groove 18, simultaneously with its bevelled surfaces 24 forcing the clamps 5 and 7 to move in their respective grooves away from one another, opposing the force of the spring 6. As the wedge 4 moves as described above, it simultaneously stretches the spring 3, and the locking pin 8 which is able to move only in the vertical direction in FIG. 3, will move in the space 27 in wedge 4. The pin is provided with a pin part and a wider flange. The pin part serves as a guide in the slot 27 and the flange part slides, as the wedge moves on its surface, until the wedge 4 reaches a position in which the recess 28 on the end of its slot (FIG. 2A), corresponding to the flange part of the pin, comes into register with the pin. As a result, the pin 8, urged by the spring 9, falls downwards so that the pin flange enters the recess 28 on the end of the slot 27 of the wedge 4. The mechanism now becomes locked in this position, in which the clamps 5 and 7 have been spaced from one another, and the article, for instance a telephone hand set, can be detached from the rack.

When the article is deposited on the rack in which the clamps are in the open position, the clamps become automatically secured to keep the article in place. This takes place in that when the article is being put in place on the rack, it simultaneously presses the push button 2 in the centre part of the rack (FIG. 1b, FIG. 3). The push button 2 pushes the locking pin 8, whereby the flange part of the pin 8 rises from the recess on the end of the slot 27 of the wedge 4. As a result, the spring 3 pulls the wedge 4 in the direction of the groove 18 and the spring 6 pulls the clamps towards each other, thus securing the article therebetween.

The bevelling of the surfaces sliding against each other and the spring forces of the springs are such that even a minimal pressure on the key 11 causes the clamps to move away from one another.

The opening and closing mechanism is covered by a separate cover 12. The rear part is provided with a suitable fixing member with which the rack can be fixed on the desired surface. In an advantageous embodiment, the fixing member is consistent with the mounting shoe disclosed in the Finnish patent application No. FI-890539, Nokia-Mobira.

On the bottom part 16, 16' of the rack, on its outer surface, may be affixed any desired auxiliary, e.g. a charger module, the connectors of which will then become connected to the connectors provided on the bottom of the article that is deposited in the rack.

The rack of the invention allows fast and secure depositing and detaching of the article, using very little force. The rack keeps the article reliably secured, independent of the position of the rack in situ. Moving parts are few, and they require little space. The practical implementation of the components may vary considerably within the scope of the claims.

What is claimed is:

1. A rack to which an article, for instance a telephone handset, is attached in a vehicle, characterized in that rack comprises:

a generally planar rectangular center part having a flange part protruding perpendicularly from one end, said flange part loosely supporting the article;

arcuate clamps disposed perpendicularly from said center part relative to its longitudinal axis so as to have free ends and located on opposite sides thereof, and which are able to slidably move between a first closed position in which the free ends are toward each other and a second position in which the free ends are away from each other, said clamps having a plane of motion parallel with the rectangular center part, each clamp having an end surface, said end surfaces facing each other within a first guide groove, each end surface having a recess;

members on said center part for facilitating the movement of the clamps to the first position and to a second position whereby the article can be attached to or detached from the rack, said members including an elongated wedge located between the end surfaces and provided with outwardly projecting surfaces complimentary in shape to said end surface recesses, said wedge being slidably movable in a direction of motion within a second guide groove.

2. The rack of claim 1, characterized in that each clamp comprises a substantially straight part moving in the first guide groove and an arcuate part, connected with the straight part, vaulting away from the planar center part.

3. The rack of claim 1, characterized in that the wedge has a projecting pin, said members include a key having a region in contact with the elongated wedge, said key being slidably movable at right angles with respect to the wedge's direction of motion and comprising an elongated plate, one end face thereof protruding on a side of the rack, and its region in contact with the wedge being provided with an aperture having a sloped surface so that when the key is pressed, the pin on the wedge slides along said sloped surface and forces the wedge to move in said second guide groove away from said first guide groove causing the end surfaces of the clamps to be moved away from each other by the outwardly projecting surfaces of the wedge, whereby the clamps move away from each other to the second position.

4. The rack of claim 3, characterized in that said members further include a locking pin, arranged to move axially and perpendicular to the second guide groove, said wedge having in a slot in which the locking pin is located and which locks the wedge, and thus also the clamps, in the second open position in which the clamps are far from each other.

5. The rack of claim 4, characterized in that the planar center part carries a push button which is coaxial with the locking pin, whereby when the push button is pressed, the locking pin will rise out from the locking position in the slot of the wedge due to the force of a first spring connecting the clamps, the clamps slide towards each other into the first closed position in which the clamps are toward each other, and by effect of the end surfaces of the clamps the outwardly projecting surfaces of the wedge, and the force of a second spring acting on the wedge, the wedge slides in between the end surfaces of the clamps.

6. A rack to which an article, for instance a telephone handset, is attached in a vehicle, characterized in that the rack comprises:
- a generally planar rectangular center part having a flange part protruding perpendicularly from one end, said flange part loosely supporting the article;
- arcuate clamps disposed perpendicularly from said center part relative to its longitudinal axis so as to have free ends and located on opposite sides thereof, and which are able to slidably move between a first closed position in which the free ends are toward each other and a second position in which the free ends are away from each other, said clamps having a plane of motion parallel with the planar rectangular center part; and
- members on said center part, linear movement of one of said members causing the simultaneous movement of both of the clamps in opposite directions to the first position and to the second position whereby the article can be attached to or detached from the rack.

7. The rack of claim 6 characterized in that the flange part includes prongs and a bridge connecting said prongs.

8. The rack of claim 6, characterized in that said flange part has fluted sides extending longitudinally therefrom, also for loosely supporting the article.

* * * * *